(12) United States Patent
Heyn

(10) Patent No.: US 6,258,312 B1
(45) Date of Patent: Jul. 10, 2001

(54) METHOD FOR PRODUCING A CONTAINER CLOSURE

(75) Inventor: William M. Heyn, New Canaan, CT (US)

(73) Assignee: Polystar Packaging, Incorporated, Norwalk, CT (US)

(*) Notice: Subject to any disclaimer, the term of this patent is extended or adjusted under 35 U.S.C. 154(b) by 0 days.

(21) Appl. No.: 08/307,153

(22) Filed: Sep. 16, 1994

Related U.S. Application Data

(62) Division of application No. 08/135,655, filed on Oct. 14, 1993, now abandoned, which is a continuation of application No. 07/741,235, filed on Aug. 5, 1991, now abandoned, which is a continuation of application No. 07/451,811, filed on Dec. 18, 1989, now abandoned.

(51) Int. Cl.[7] ................................................. B29C 45/14
(52) U.S. Cl. ............................ 264/252; 264/254; 264/275
(58) Field of Search ................................. 264/252, 259, 264/266, 267, 268, 275, 510, 297.4, 254; 425/129.1

(56) References Cited

U.S. PATENT DOCUMENTS

| | | | |
|---|---|---|---|
| 2,456,972 | * 12/1948 | Maeder, Jr. et al. | 264/268 |
| 3,207,830 | * 9/1965 | Aldington | 264/268 |
| 3,597,298 | * 8/1971 | Stengle, Jr. | 264/268 |
| 4,695,420 | * 9/1987 | Grawey et al. | 264/252 |
| 4,710,338 | * 12/1987 | Bagnall et al. | 264/266 |
| 4,846,646 | * 7/1989 | Magnusson | 264/268 |
| 4,965,035 | * 10/1990 | Ishiwatari et al. | 264/268 |
| 5,013,516 | * 5/1991 | Suzuki et al. | 264/251 |
| 5,116,556 | * 5/1992 | Danton | 264/252 |
| 5,171,508 | * 12/1992 | Ishizu et al. | 264/252 |
| 5,273,416 | * 12/1993 | Heyn et al. | 264/252 |

FOREIGN PATENT DOCUMENTS

2380196 * 9/1978 (FR).

* cited by examiner

*Primary Examiner*—Angela Ortiz
(74) *Attorney, Agent, or Firm*—William H. Holt

(57) ABSTRACT

A closure for a container, and a method for producing the same, wherein the closure includes an end panel and a plastic frame member connected together and which can be place over, or snapped onto, and then the frame member can be permanently attached and hermetically sealed to the flange of a metal, glass, plastic or composite container or can. The interface of the end panel and frame member is such as to hermetically, seal the container and yet the end panel can be readily peeled from at least a portion of the frame member for gaining access to the interior of the container. A pull tab, or ring, is provided to assist in peeling the end panel to an open position. Depending on the manner of attaching or securing the end panel to the frame member, separation or peeling can result from an adhesive failing or from a cohesive failing of the material forming the frame member, or the end panel, or the adhesive.

11 Claims, 3 Drawing Sheets

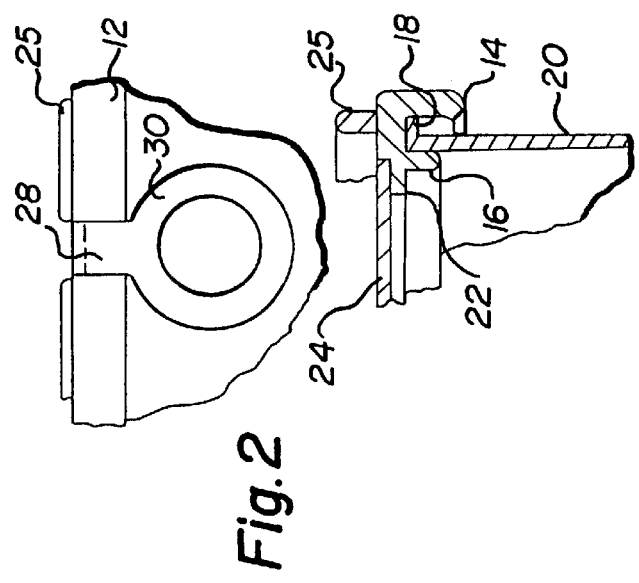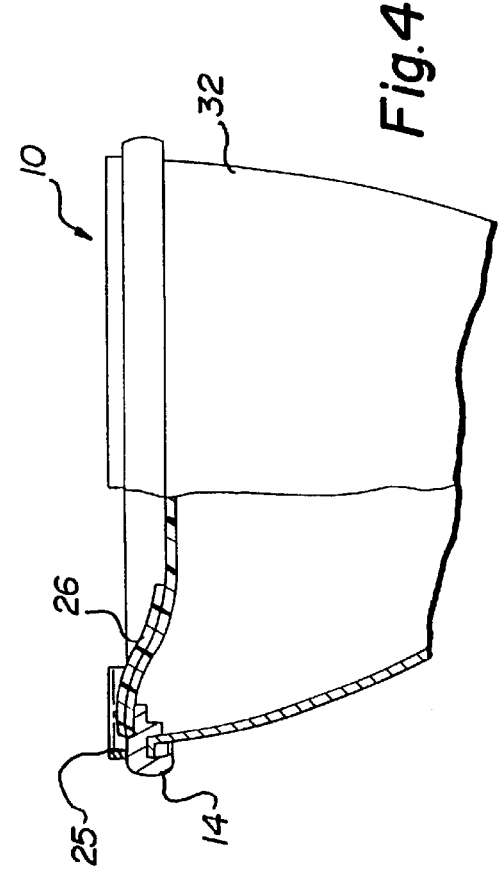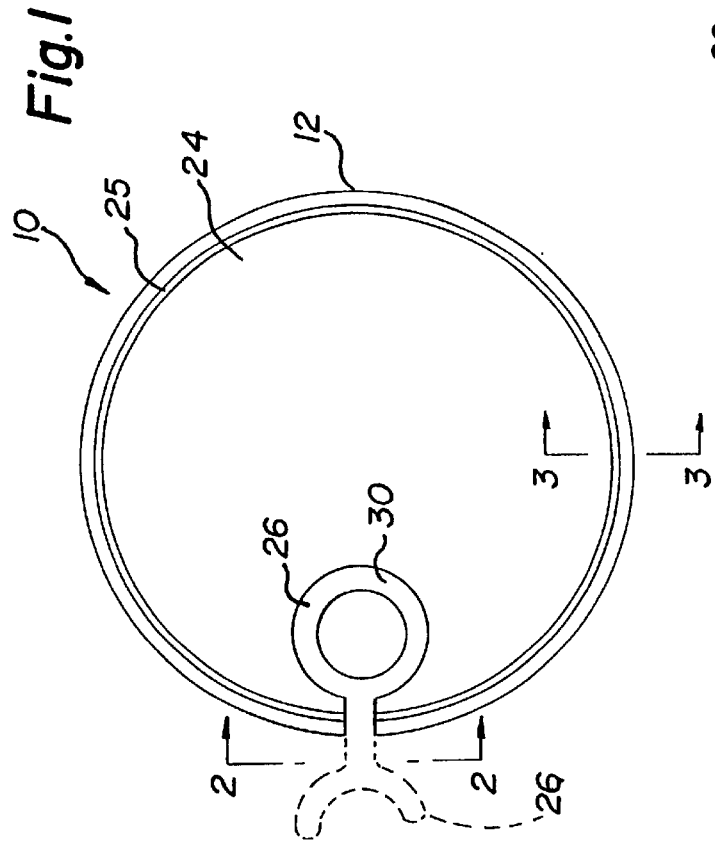

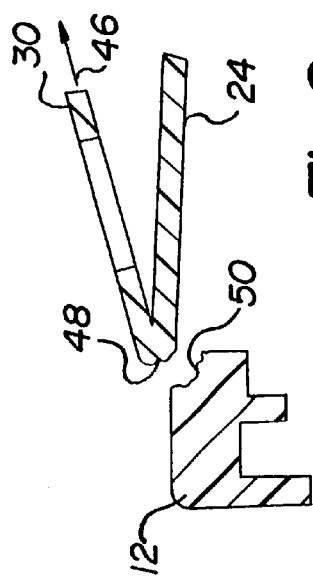
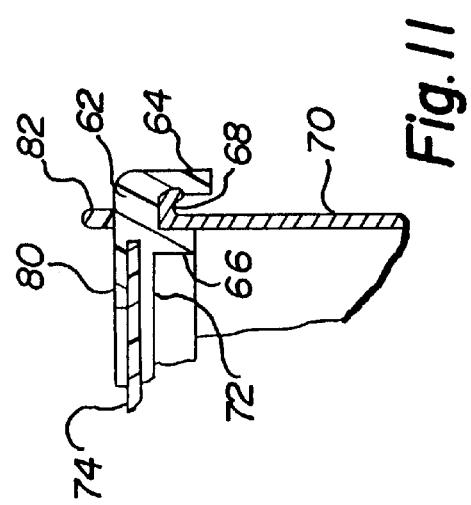
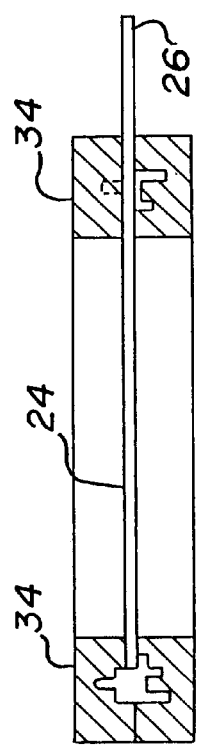
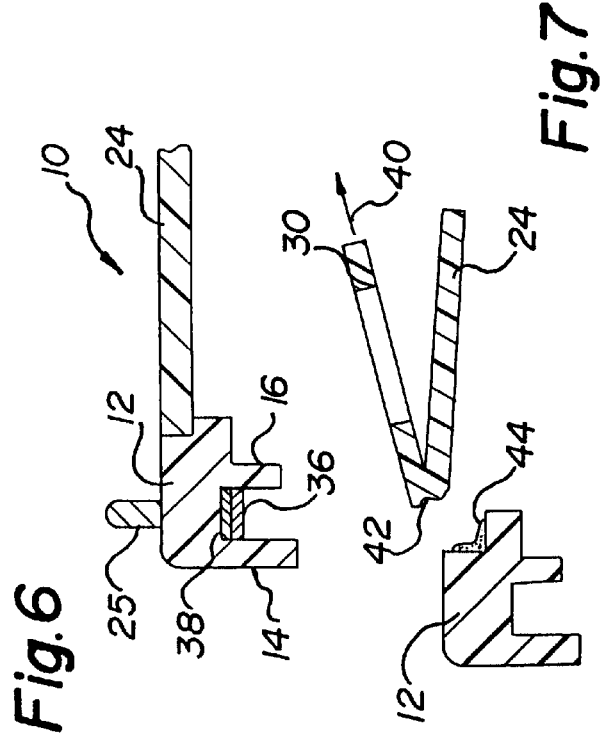

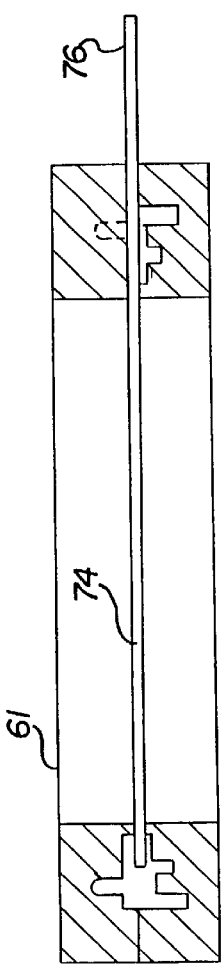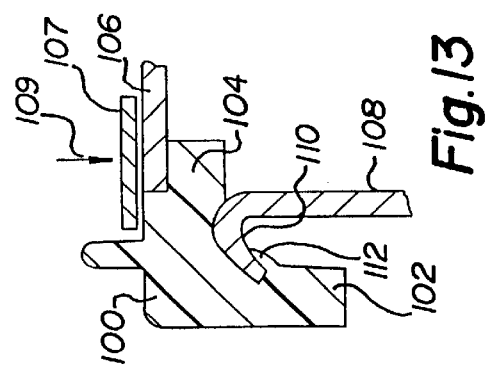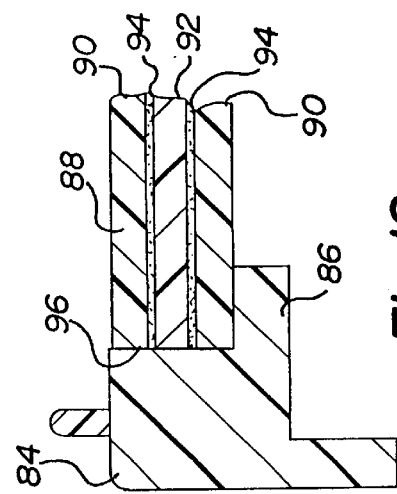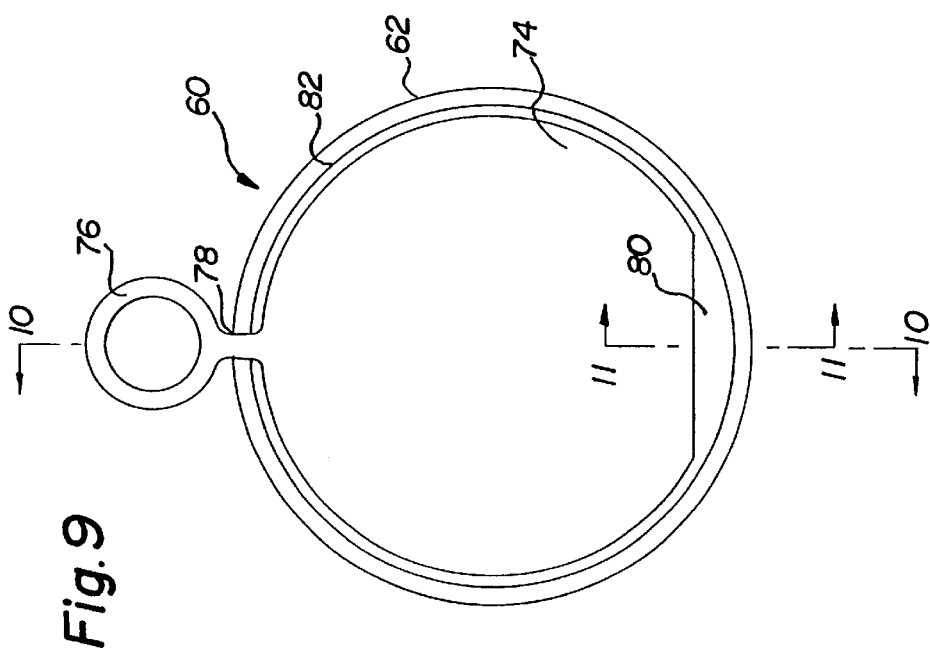

METHOD FOR PRODUCING A CONTAINER CLOSURE

CROSS-REFERENCE TO RELATED APPLICATIONS

This is a division of application Ser. No. 08/135,655, filed Oct. 14, 1993, now abandoned, which is a continuation of application Ser. No. 07/741,235, filed Aug. 5, 1991, now abandoned, which is a continuation of application Ser. No. 07/451,811, filed Dec. 18, 1989, now abandoned.

BACKGROUND OF THE INVENTION

This invention relates to a container closure and more particularly to a novel method for producing a container closure for containers for liquids and solids, such as food and beverages.

Heretofore a large percentage of food and beverage containers have been formed of metal can bodies which have one or both ends thereof closed by a metal can end double seamed to a flange of the container for forming a hermetically sealed container. Such containers, while generally satisfactory, do have various shortcomings. For example, some metal containers are formed of thin metal which can be easily dented, which at times detracts from their marketability. Further, such containers must be protected with various coatings and/or sealants which need to be carefully selected to be compatible with the contents, thus adding to the costs and difficulties of manufacturing as well as creating a need for a large variety of processes and inventory. In addition, metal containers are plagued with sharp metal edges after being opened.

SUMMARY OF THE INVENTION

The invention comprises a closure member for a container, and the combination thereof, wherein the closure is formed of multiple parts which include a frame member preferably molded from a thermoplastic material. The frame member includes one or more depending skirts, or flanges, which may be snapped onto and then permanently bonded to the flange of a metal, glass or plastic container. The frame member is annular, i.e., ring-like, and conforms to the shape of container whether it be round, square, triangular, elliptical or of some other cross-section. The central, open portion of the frame member is preferably provided with a disk portion which is adhered to, or bonded to, the frame member as part of an insert-injection molding process in which the previously formed disk member is placed within a mold and the frame member is formed and adheres to the disk member. Depending upon the choice of materials for the frame member and disk member, the interface of the two members, while strong enough to structurally seal the container and hold the product, can be easily separated by peeling the disk member away from the frame member for gaining access to the product within the container.

The materials of the disk and frame members may be selected such that the heat and pressure of the frame molding operation will create a bond therebetween but it is within the scope of the invention that the interface between these two members can contain a layer or coating of an adhesive material or the interface can be sealed with a film or a foil. In order to assist in peeling the disk member from the frame member, the disk member is provided with a pull tab that can be in the form of a pull ring for providing a sure grip.

In view of the foregoing, it is an object of the invention to provide a closure for a container, the closure including a frame member and an end panel, means attaching the end panel to the frame member, the frame member comprising an injection molded plastic article including means for securing the frame member and the end panel to a container, and means for peeling the end panel from at least a portion of the frame member.

A further object of the invention is to provide such a closure which is comprised of at least one layer of plastic material and includes a pull tab integrally formed therewith.

A further object of the invention is to provide such a closure wherein the end panel is comprised of multi-layers adhered together and including top and bottom layers of polypropylene and an inner layer ethylene vinyl alcohol, and adhesive means for adhering the multi-layers together into a unitary panel.

A still further object of the invention is to provide a method of forming a container closure including the steps of forming an end panel in the shape of a planar disk; inserting the disk into a mold having a mold cavity for forming a frame member shaped to be secured to the flange of a container; and injecting plastic material into the mold cavity for forming the frame member and for attaching the end panel to the frame member.

An additional object of the invention is to provide a method as set out above wherein the step of forming the end panel includes the step of providing a pull tab extending co-planar with the disk, and wherein the step of forming the frame member includes the step of providing the frame member with an upstanding rib means extending about an upper surface of the frame member for facilitating stacking of a plurality of the closures and for protecting the pull tab.

An even further object of the invention is to provide the method described above with a step of forming a securing strip as part of the frame member for fixedly securing a portion of the end panel to the frame member.

BRIEF DESCRIPTION OF THE DRAWINGS

FIG. 1 is a plan view of a container closure formed in accordance with the invention.

FIG. 2 is a fragmentary vertical elevational view taken of line 2—2 of FIG. 1 and shows a pull tab disposed adjacent the body of the container.

FIG. 3 is a fragmentary sectional view, taken on line 3—3 of FIG.1, showing a stacking rib formed integral with an upper surface of the molded frame member, and shows the frame member as including a pair of skirt, or flange, members for snapping over and being secured to a flange of the container.

FIG. 4 is a fragmentary elevational view, partly in section, showing a completed container in the shape of a bowl and having the pull tab disposed in a position overlying the disk member which forms the end panel.

FIG. 5 is a fragmentary view, partly in section, showing the disk member, or end panel, inserted within a mold having cavities therein for shaping the frame member.

FIG. 6 is a fragmentary, sectional view of a portion of the frame member and shows the location for placing adhesives or inductive sensitive material useful for securing the frame member to a container by an induction heating process.

FIG. 7 shows separation of the end panel from the frame member resulting from cohesive failing of the material forming the end panel.

FIG. 8 shows separation of the end panel from the frame member resulting from cohesive failing of the material forming the frame member.

FIG. 9 is a plan view of a closure member similar to the one shown in FIG. 1 but provided with a sealing strip for sealing along a line of joinder between the frame member and end panel for precluding complete separation of the end panel from the frame member.

FIG. 10 is a fragmentary view, partly in section, showing the disk member inserted in a mold which is shaped to include the sealing strip for keeping the end panel connected to the frame member.

FIG. 11 is similar to FIG. 3 and shows the edge of a container flange being buried in the frame member, and protected thereby, and the top of the end panel being secured by an overlying sealing strip.

FIG. 12 is a fragmentary sectional view of a form of the invention wherein the end panel is comprised of a laminate of several layers of material adhered together and having the edge faces thereof abutting the frame member for precluding, for example, attack of the layers by air, or moisture, during processing, or thereafter.

FIG. 13 is a fragmentary, sectional view showing the raw edge portion of a container being buried in the frame member. Various internal and external coating materials and finishes which are compatible with usage of the container are not shown but may be added.

DETAILED DESCRIPTION

First, referring to FIGS. 1–3, a closure member, generally indicated by the numeral 10, includes a frame member 12 having a pair of spaced skirts or flanges 14 and 16 depending therefrom for receiving the flange 18 of a container 20. It is to be understood that only a single depending flange, 14 or 16, may be used depending upon whether the container 20 is formed of metal, glass, plastic or a composite material.

Frame member 12 includes a ledge or shelf portion 22 along its inner circumference for attachment to the outer periphery of a disk member which forms an end panel 24. The upper surface of frame member 12 is provided with an integrally molded, upstanding rib member 25 which is useful for stacking a plurality of containers upon each other and also useful for nesting a plurality of closure members 10 in an assembly operation. Also, the rib member helps position or protect a pull tab 26 in the various positions shown in FIGS. 1, 2 and 4. Pull tab 26 includes a tongue portion 28 and, terminates in a pull ring 30 which provides for a secure grip to assist in peeling end panel 24 from frame member 12 along the interface provided by ledge or shelf portion 22. End panel 24 is secured to frame member 12, along shelf portion 22 in different ways, such as with a suitable adhesive or simple bonding of the materials during an insert-injection molding process to be later described.

FIG. 4 shows a form of bowl-type container 32 having a closure member 10 wherein pull tab 26 is positioned over the end panel 24 and disposed below rib 25 so as not to interfere therewith. Note that end panel 24 is shown as being drawn into container 32, such as can occur during vacuum processing of some products. End panel 24 may be preshaped as concave or convex.

FIG. 5 shows cross-sectional portions of an annular mold 34 which is split along a horizontal line thereof and has a disk member or end panel 24 inserted therein prior to plastic material being injected under pressure into the mold for forming frame member 12. During the molding process, frame member 12 and disk member 24 can be bonded or adhered together by the heat and pressure of the molding process or, if desired, through the use of adhesive material applied to the peripheral portion of disk member 24 prior to insertion into the mold 34. Pull tab 26 is disposed generally co-planar with end panel 24 and extends outwardly from the mold 34 and does not interfere with closing of the mold.

FIG. 6 shows one form of closure member 10 which is provided with adhesive material 36 for securing frame member 12 to the rim or flange of a container. If it is desired to use inductive heating for curing the adhesive 36, it will be necessary, except when used in connection with metal cans, to provide induction sensitive material for creating the required heat. Exemplary of this, metal material 38 is shown located adjacent to the adhesive material 36. Of course, it is to be understood that the metal material 38 may be in the form of a wire, or a thin strip, or even in powdered form and even intermixed with adhesive 36. The preferred choice will be made depending upon the materials of the container, the materials of the adhesive and the product with which the container is intended to be used.

FIG. 7 illustrates one form of the invention wherein the material for frame member 12 and end panel 24 are such that when pull ring 30 is forcefully pulled in the direction of arrow 40, there is a cohesive failing, at 42 and 44, of the material used to form end panel 24. In a similar fashion, as is shown in FIG. 8, by choosing different materials for frame member 12 and end panel 24, applying force to the pull tab 30, in the direction of arrow 46, can result in cohesive failing of the material of frame member 12, at 48 and 50. In both instances, whether as shown in FIG. 7 or FIG. 8, frame member 12 will remain secured to the associated container (not shown in these Figures) while end panel 24 is peeled to an open position for providing access to the interior of the container.

FIGS. 9, 10 and 11 show a modified form of container closure, generally indicated by the numeral 60 and formed in accordance with split mold 61 shown in FIG. 10, and which includes a frame member 62 having a pair of spaced skirts or flanges 64 and 66 depending therefrom for receiving a flange 68 of a container 70, as is best shown in FIG. 11. Hereagain, it is pointed out that only a single depending flange, 64 or 66, may be used depending on the type of container, its material and the end use thereof.

Frame member 62 includes a ledge or shelf portion 72 along its inner circumference for attachment to the outer periphery of a disk member or end panel 74. This end panel 74 is provided with a pull tab or ring 76 attached by a narrow tongue 78. Pull ring 76 is used to peel end panel 74 from the ledge or shelf portion 72 for providing access to the product within the container 70. In order to preclude total separation of end panel 74 from frame member 62, a sealing strip 80 is provided and overlays a portion of end panel 74 for securing that portion of end panel 74 to the frame member 62, thus minimizing possible litter problems.

Frame member 62 is designed to snap over container flange 64, as is best shown in FIG. 11, and may be secured thereto in various ways, such as through the use of inductive heating or adhesives. FIG. 11 illustrates that the raw edge of container flange 68 is buried in depending closure skirt 64 thus protecting flange 68 from rust or corrosion.

Frame member 62 is provided with an integrally molded, upstanding rib member 82 for the same purposes and functions as rib member 26, namely, for stacking of containers and also being useful for nesting a plurality of closure members 60 in an assembly operation.

FIG. 12 illustrates an embodiment of the invention wherein a frame member 84 has a ledge 86 and which supports a disk member or end panel 88 which is formed of multiple layers which may include, for example, top and bottom layers 90 formed of polypropylene sandwiched to a central layer 92 of ethylene vinyl alcohol (EVOH) with adhesive layers 94. Frame member 84 includes an inner circumferential wall portion 96 against which is butted the co-terminus edge portions of layers 90, 92 and 94, thus protecting the layers 92 and 94 against moisture and oxidation.

FIG. 13 illustrates a modified form of frame member 100 which includes only a single depending flange or skirt portion 102 and includes a ledge 104 for having a disk member or end panel 106 secured thereto. End panel 106 may be formed, for example, from a layer of foil or a combination of foil and plastic. It is within the scope of the invention that a sealing strip 107 can bridge the junction of end panel 106 and frame member 100. Sealing strip 107 can be secured through, for example, the use of a suitable adhesive or the use of induction heating, and pressure applied in the direction of arrow 109.

Frame member 100 is shown as being secured to a container 108 which has a container flange 110 embedded in the underside of ledge 104 and in skirt portion 102. The container flange 110 is embedded either mechanically or in combination with an inductive heating process, or a combination of heat and mechanical pressure. Note that the plastic material of skirt portion 102 flows around and under container flange 110, at 112, for providing a firm attachment and also for protecting the raw edge of flange 110.

Regarding the embodiments of FIGS. 12 and 13, the disk members or end panels 88 and 106 may be secured to their respective frame members in the same manner as the showings in FIGS. 6, 7 and 8, and as previously described.

The foregoing description and the accompanying drawings show and describe preferred forms of closures and methods of forming the same but it is to be understood that various changes and modifications can be made thereto without departing from the spirit and scope of the invention as defined by the appended claims.

I claim:

1. A method of forming a closure for subsequent attachment to a separate preformed container, the method comprising the steps of: forming an end panel having an integral pull tab at a periphery thereof; the method being characterized by the steps of inserting said end panel into a mold having a cavity for forming a frame member shaped to be permanently secured to a flange of the container; and injecting a plastic material into said mold cavity for forming said frame member and for attaching said end panel to said frame member, characterized in that said mold cavity is further provided with a portion for forming, during said molding injection step, a partial sealing strip overlying said end panel for preventing, in use, complete separation of said end panel from said frame member.

2. A method of forming a closure according to claim 1 characterized in that said pull tab is connected to said end panel by a narrow tongue portion.

3. A method of forming a closure according to claim 1 characterized in that said end panel is first provided with an adhesive material applied to the portion to be joined to said frame member.

4. A method of forming a closure according to claim 1 characterized in that said mold cavity includes a portion for forming a radially directed shelf portion on said frame member and to which said end panel is joined.

5. A method of forming a closure according to claim 1 characterized in that said mold cavity includes a portion for forming an upstanding rib member on the upper surface of said frame member.

6. A method of forming a closure according to claim 1 characterized by further including the step of providing said frame member with an adhesive material for securing said closure to said container.

7. A method of forming a closure according to claim 6 characterized in that said adhesive material is associated with induction heating sensitive material.

8. A method of forming a closure according to claim 1 characterized in that said end panel comprises a plurality of layers of material.

9. A method of forming a closure according to claim 8 characterized in that said layers have intervening layers of adhesive material.

10. A method of forming a closure according to claim 1 characterized in that said end panel is preshaped prior to insertion into said mold cavity.

11. A method of forming a closure for subsequent attachment to a separate preformed container, the method comprising the steps of: forming an end having an integral pull tab at a periphery thereof, the method being characterized by the steps of inserting said end panel into a mold having a cavity for forming a frame member shaped to be permanently secured to a flange of the container; and injecting a plastic material into said mold cavity for forming said frame member and for attaching said end panel to said frame member, characterized by further including the step of applying a sealing strip for bridging a joint line between said frame member and said end panel.

\* \* \* \* \*